United States Patent
Chen et al.

(10) Patent No.: US 8,629,963 B2
(45) Date of Patent: Jan. 14, 2014

(54) LIQUID CRYSTAL DISPLAYS

(75) Inventors: Chien-Hong Chen, Chu-Nan (TW);
Jia-Lun Chen, Chu-Nan (TW)

(73) Assignees: Innocom Technology (Shenzhen) Co., Ltd., Shenzhen (CN); Chimei Innolux Corporation, Chu-Nan (TW)

( * ) Notice: Subject to any disclaimer, the term of this patent is extended or adjusted under 35 U.S.C. 154(b) by 135 days.

(21) Appl. No.: 13/408,879

(22) Filed: Feb. 29, 2012

(65) Prior Publication Data

US 2012/0224129 A1      Sep. 6, 2012

(30) Foreign Application Priority Data

Mar. 2, 2011    (TW) .............................. 100106847 A

(51) Int. Cl.
*G02F 1/1343*      (2006.01)
(52) U.S. Cl.
USPC .......................... 349/142; 349/144; 349/146

(58) Field of Classification Search
None
See application file for complete search history.

(56) References Cited

U.S. PATENT DOCUMENTS

| | | | |
|---|---|---|---|
| 7,426,006 B2 * | 9/2008 | Lai | 349/129 |
| 2010/0026948 A1 * | 2/2010 | Wang et al. | 349/129 |

* cited by examiner

*Primary Examiner* — Richard Kim
(74) *Attorney, Agent, or Firm* — Liu & Liu

(57) ABSTRACT

In an embodiment of the invention, a liquid crystal display is provided. The liquid crystal display includes a first substrate, a first electrode formed on the first substrate, wherein the first electrode includes a plurality of subpixels, and each the subpixel includes a plurality of subunits, and each the subunit includes a plurality of first slits and a plurality of second slits, wherein the first slits are connected to the second slits and the first slits of the subunits which are adjacent to each other are connected to each other, a second substrate opposite to the first substrate, a second electrode formed on the second substrate, and a liquid crystal layer disposed between the first electrode and the second electrode.

18 Claims, 7 Drawing Sheets

LIQUID CRYSTAL DISPLAYS

CROSS REFERENCE TO RELATED APPLICATIONS

This Application claims priority of Taiwan Patent Application No. 100106847, filed on Mar. 2, 2011, the entirety of which is incorporated by reference herein.

BACKGROUND OF THE INVENTION

1. Field of the Invention

The invention relates to a liquid crystal display, and in particular to a liquid crystal display capable of reducing moving retention.

2. Description of the Related Art

In a liquid crystal display, an angle of a transmission axis of a polarizer is, for example, 45°, 135° and −45°, −135°. That is, when the angle "φ" of liquid crystal molecules is 45°, 135° or −45°, −135°, a brighter image is produced. Currently, in a conventional liquid crystal display with an entire ITO electrode (without patterning), the liquid crystal molecules are fully tilted in the direction "θ". However, such liquid crystal displays have poor control of the tilt of the liquid crystal molecules in the direction "φ" and cannot limit the angle "φ" of the liquid crystal molecules to 45°, 135° and −45°, −135° which is similar to the angle of the transmission axis of the polarizer. The reason is that although the liquid crystal display with the entire ITO electrode possesses a larger vertical electric filed, no fringe field is produced therefrom to accurately control the direction of the liquid crystal molecules, resulting in an unstable tilt state thereof. The brightness and image quality are thus deteriorated, and especially, results in a moving retention phenomenon.

BRIEF SUMMARY OF THE INVENTION

One embodiment of the invention provides a liquid crystal display, comprising: a first substrate; a first electrode formed on the first substrate, wherein the first electrode comprises a plurality of subpixels, and each the subpixel comprises a plurality of subunits, and each the subunit comprises a plurality of first slits and a plurality of second slits, wherein the first slits are connected to the second slits and the first slits of the subunits which are adjacent to each other are connected to each other; a second substrate opposite to the first substrate; a second electrode formed on the second substrate; and a liquid crystal layer disposed between the first electrode and the second electrode.

The disclosed liquid crystal display with a patterned electrode comprising various slit structures formed thereon produces a fringe field to stabilize liquid crystal molecules towards a certain direction which can produce the brightest state (e.g., the angle "φ" of the liquid crystal molecules is, for example 45°, 135° or −45°, −135°). The moving retention phenomenon is thus substantially reduced, effectively improving image quality.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

Figure 1:
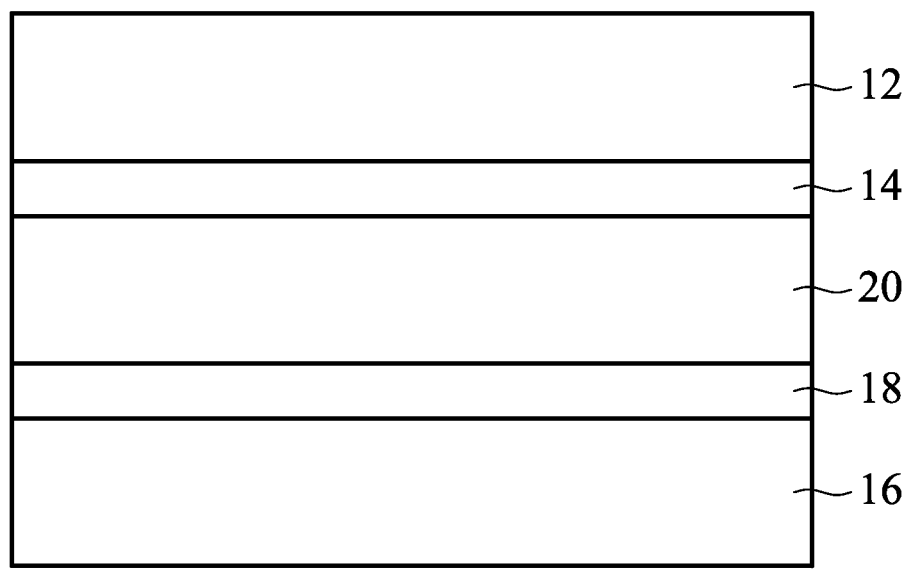
FIG. 1 shows a cross-section view of a liquid crystal display according to an embodiment of the invention.

Referring to FIGS. 1-7, according to an embodiment of the invention, a liquid crystal display is illustrated. FIG. 1 is a cross-section view of a liquid crystal display. As shown in FIG. 1, a liquid crystal display 10 comprises a first substrate 12, a first electrode 14, a second substrate 16, a second electrode 18 and a liquid crystal layer 20. The first electrode 14 is formed on the first substrate 12. The second substrate 16 is opposite to the first substrate 12. The second electrode 18 is formed on the second substrate 16. The liquid crystal layer 20 is disposed between the first electrode 14 and the second electrode 18.

In an embodiment, the first substrate 12 may comprise a color filter (CF). The second substrate 16 may comprise a thin film transistor (TFT). In an embodiment, the first electrode 14 or the second electrode 18 may be, for example indium tin oxide (ITO).

Figure 2:
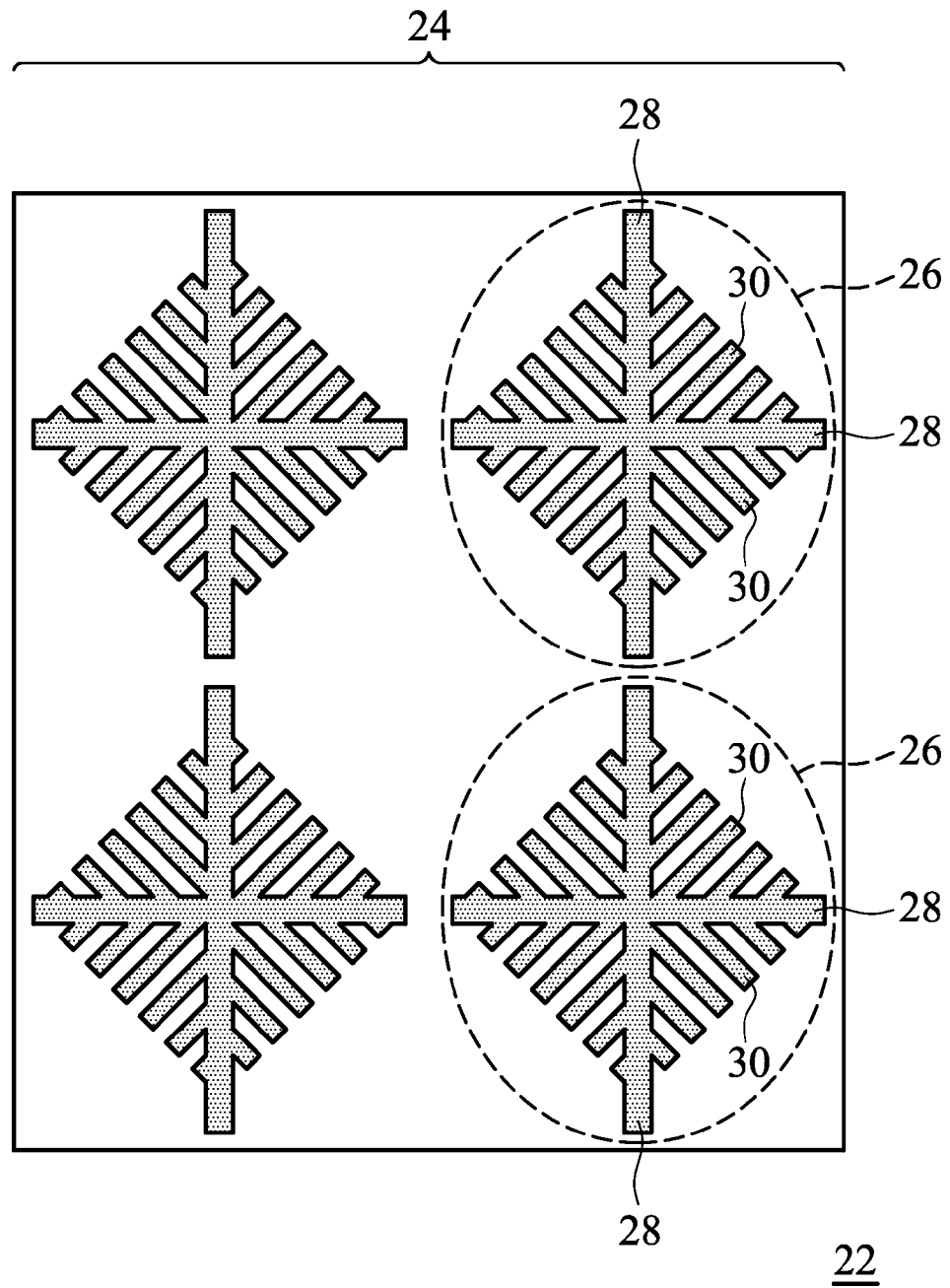
FIG. 2 shows a top view of an electrode structure of a liquid crystal display according to an embodiment of the invention.

Referring to FIG. 2, according to an embodiment of the invention, an electrode structure of a liquid crystal display is illustrated. FIG. 2 is a top view of an electrode structure (for example the first electrode 14). As shown in FIG. 2, the electrode 22 comprises a plurality of subpixels 24. Each subpixel 24 comprises a plurality of subunits 26. Each subunit 26 comprises a plurality of first slits 28 and a plurality of second slits 30. The first slits 28 are connected to the second slits 30.

In an embodiment, the first slits 28 may be arranged in a cross shape. The second slits 30 may be arranged at an oblique angle to the first slits 28. The oblique angle is determined by a specific angle of a transmission axis of a polarizer, for example 0°, 45°, 90° or 135°. In FIG. 2, the second slits 30 are arranged at 45° to the first slits 28.

Figure 3:
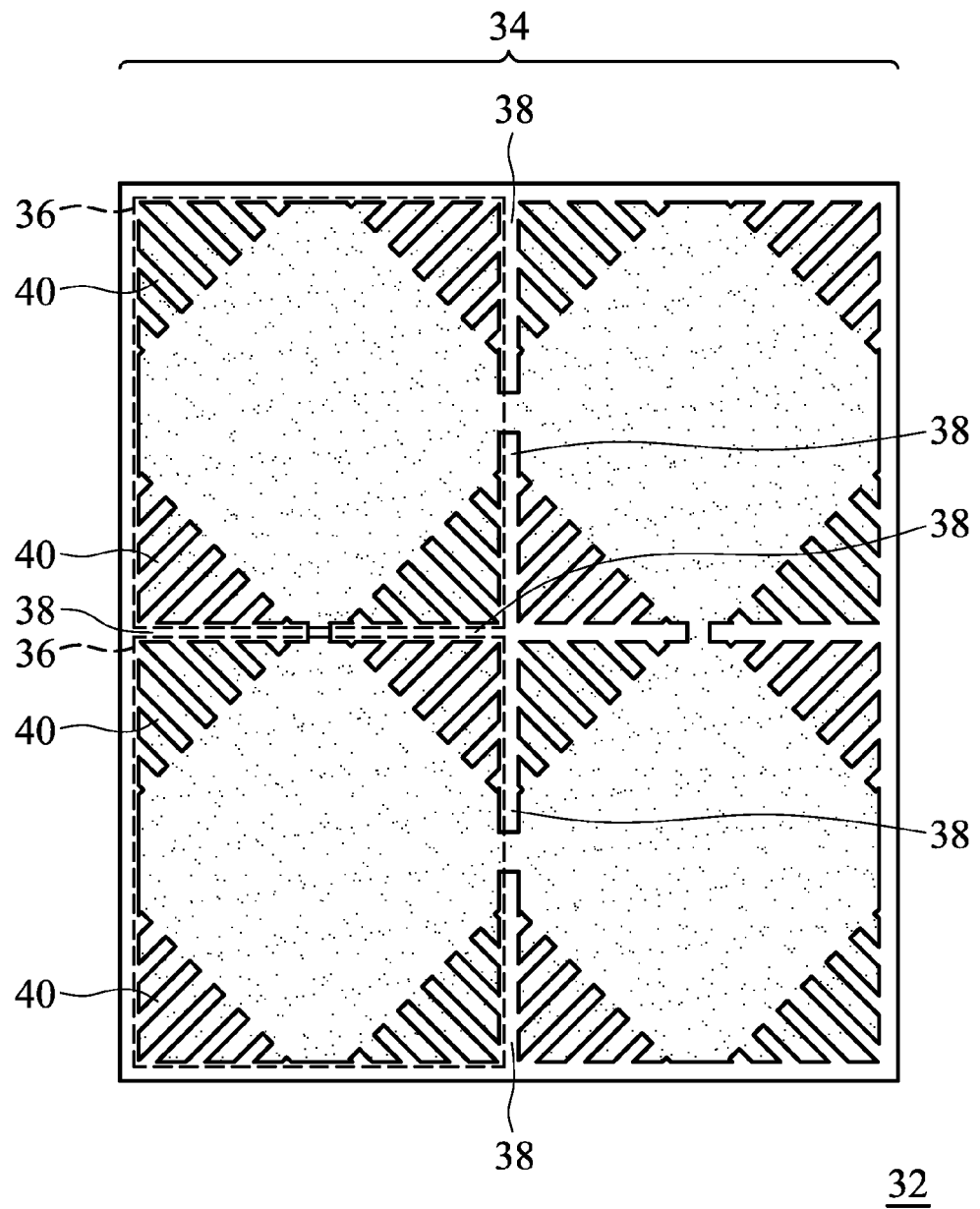
FIG. 3 shows a top view of an electrode structure of a liquid crystal display according to an embodiment of the invention.

Referring to FIG. 3, according to an embodiment of the invention, an electrode structure of a liquid crystal display is illustrated. FIG. 3 is a top view of an electrode structure (for example the second electrode 18). As shown in FIG. 3, the electrode 32 comprises a plurality of subpixels 34. Each subpixel 34 comprises a plurality of subunits 36 and a plurality of third slits 38. The subunits 36 are separated by the third slits 38.

In an embodiment, the third slits 38 may be arranged in a cross shape, as shown in FIG. 3. In this embodiment, the electrode 32 may further comprise a plurality of fourth slits 40, as shown in FIG. 3. The fourth slits 40 are connected to the third slits 38. In an embodiment, the fourth slits 40 may be arranged at an oblique angle to the third slits 38. The oblique angle is determined by a specific angle of a transmission axis of a polarizer, for example 0°, 45°, 90° or 135°. In FIG. 3, the fourth slits 40 are arranged at 45° to the third slits 38.

Figure 4:
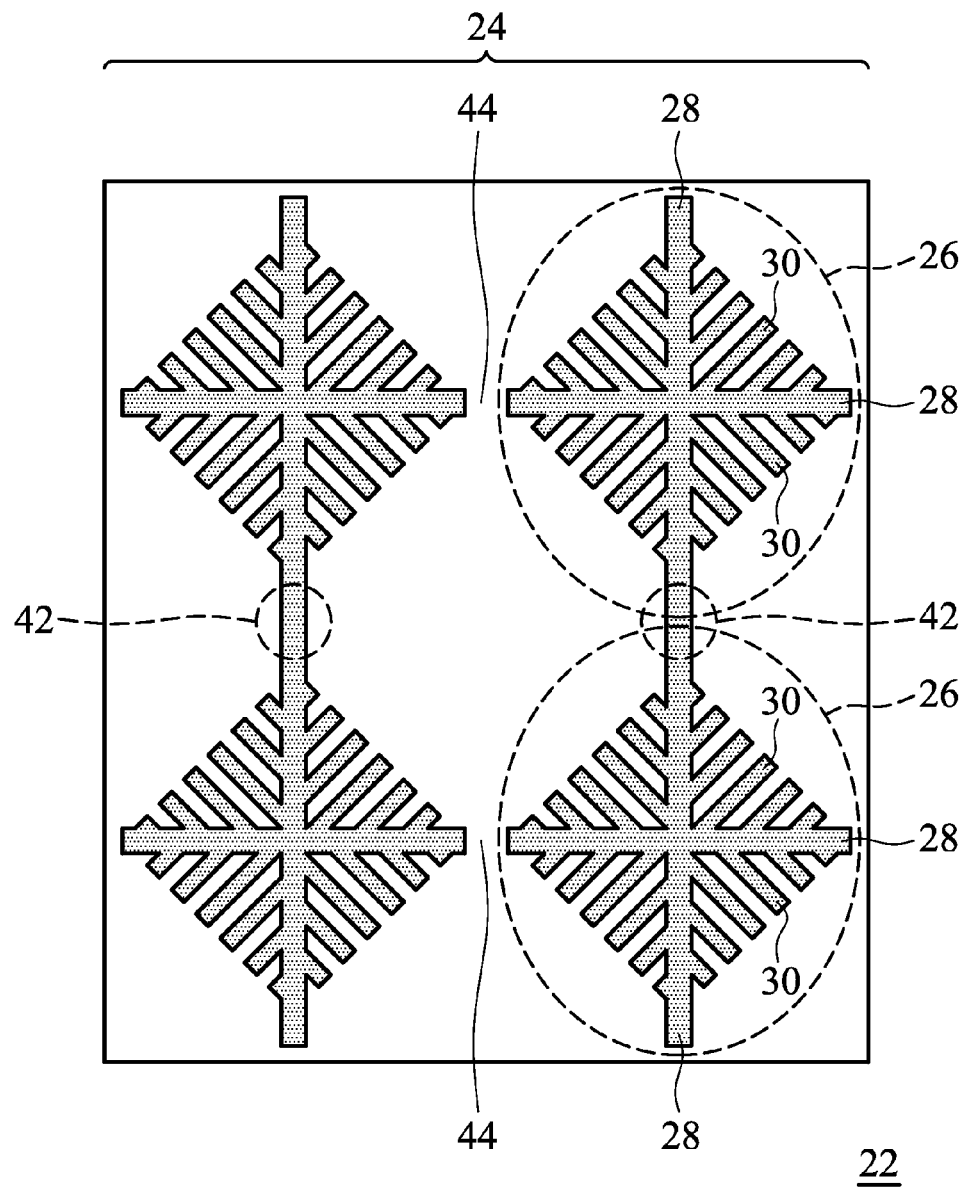
FIG. 4 shows a top view of an electrode structure of a liquid crystal display according to an embodiment of the invention.

Specifically, in FIG. 2, the first slits 28 of a part of the subunits 26 of the electrode 22 are connected to the first slits 28 of the adjacent subunits 26 to form a plurality of slit junction 42 on the electrode 22, as shown in FIG. 4. Meanwhile, the electrode 22 in an extended axis (no slit junction formation) of the first slit 28 is selected as an electrical connection area 44, as shown in FIG. 4. The width of the electrical connection area 44 is about 2-6 μm.

Figure 5:
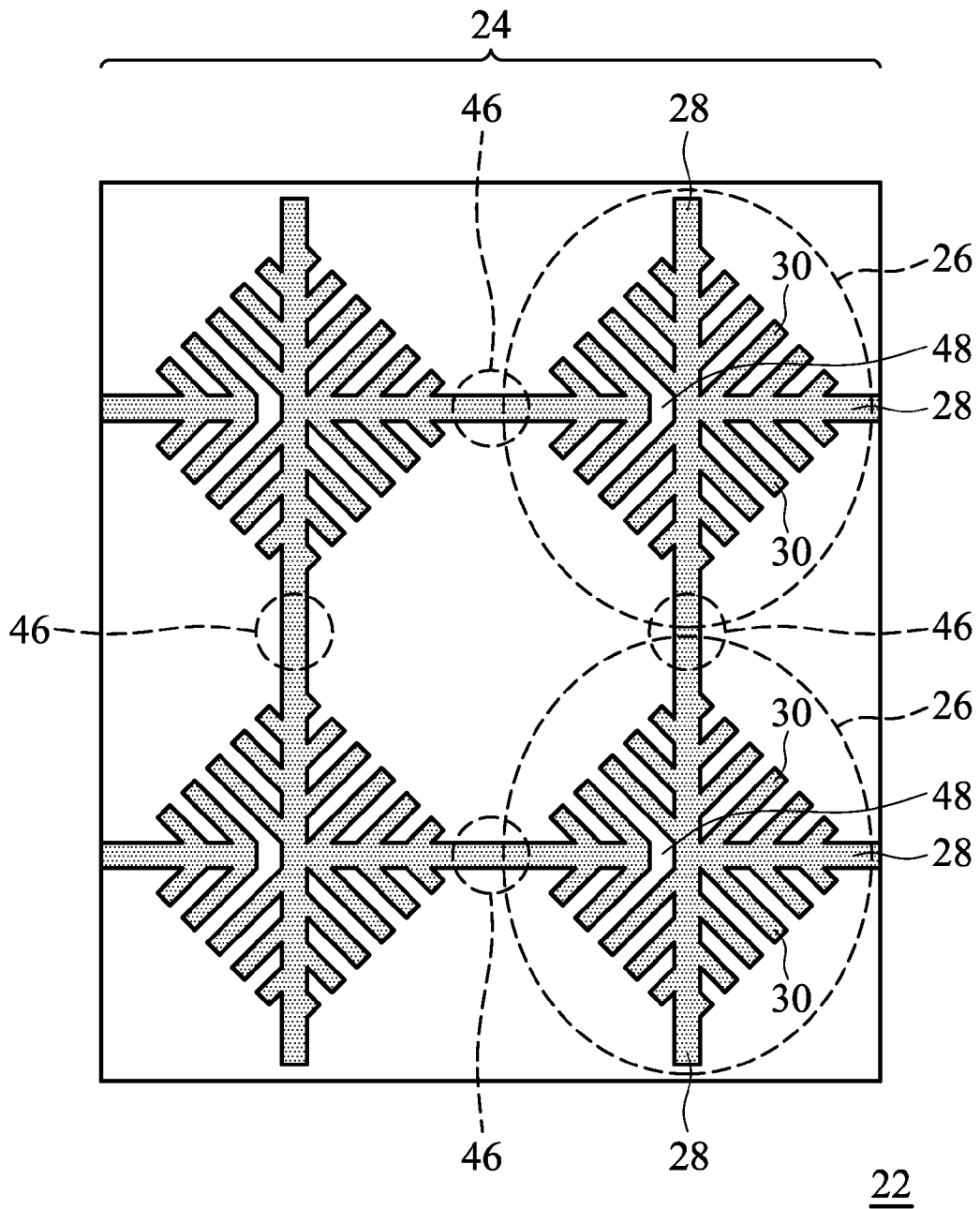
FIG. 5 shows a top view of an electrode structure of a liquid crystal display according to an embodiment of the invention.

In another embodiment, the first slits 28 of all of the subunits 26 of the electrode 22 are connected to the first slits 28 of the adjacent subunits 26 to form a plurality of slit junction 46 on the electrode 22, as shown in FIG. 5. Meanwhile, the electrode 22 in a junction of the first slit 28 and the second slit 30 is selected as an electrical connection area 48, as shown in FIG. 5.

Figure 6:
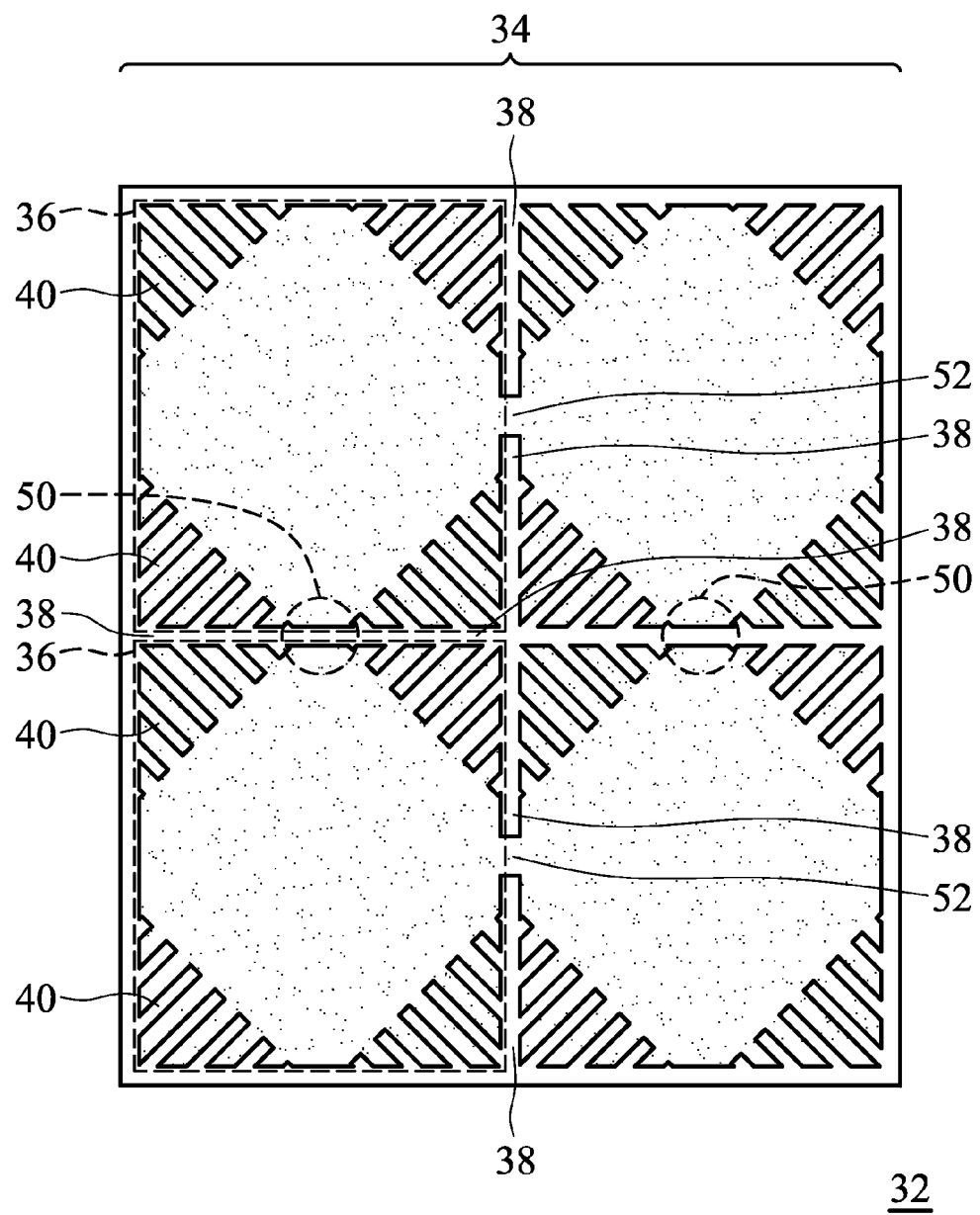
FIG. 6 shows a top view of an electrode structure of a liquid crystal display according to an embodiment of the invention.

Additionally, in FIG. 3, the third slits 38 between a part of the two adjacent subunits 36 of the electrode 32 are connected to each other to form a plurality of slit junctions 50 on the electrode 32, as shown in FIG. 6. Meanwhile, the electrode 32 in an extended axis (no slit junction formation) of the third slit 38 is selected as an electrical connection area 52, as shown in FIG. 6. The width of the electrical connection area 52 is about 2-6 μm.

Figure 7:
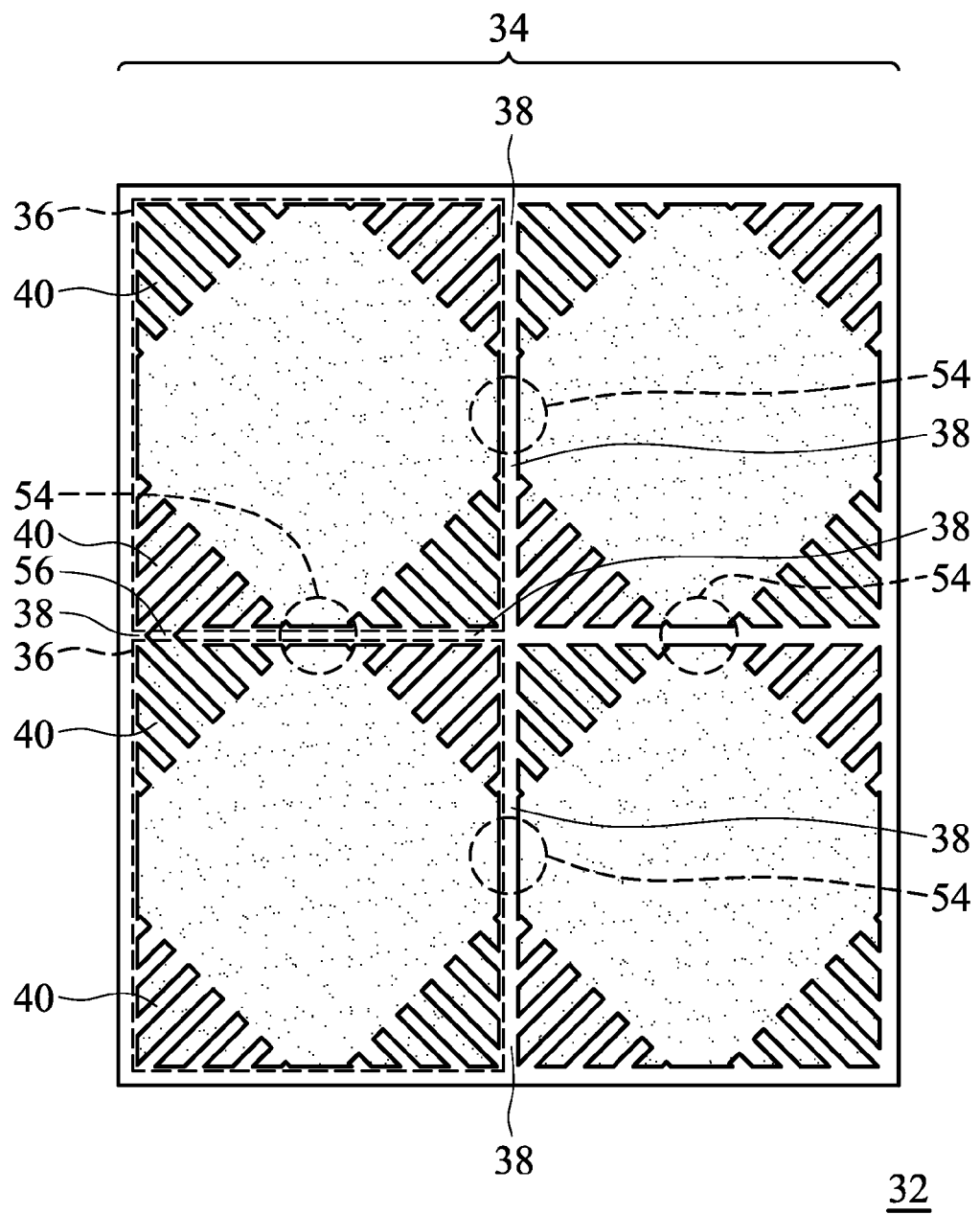
FIG. 7 shows a top view of an electrode structure of a liquid crystal display according to an embodiment of the invention.

In another embodiment, the third slits 38 between all of the two adjacent subunits 36 of the electrode 32 are connected to each other to form a plurality of slit junctions 54 on the electrode 32, as shown in FIG. 7. Meanwhile, the electrode 32 in a junction of the third slit 38 and the fourth slit 40 is selected as an electrical connection area 56, as shown in FIG. 7.

The disclosed liquid crystal display with a patterned electrode comprising various slit structures formed thereon produces a fringe field to stabilize liquid crystal molecules towards a certain direction which can produce the brightest state (e.g., the angle "ϕ" of the liquid crystal molecules is, for example 45°, 135° or −45°, −135°). The moving retention phenomenon is thus substantially reduced, effectively improving image quality.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising:
   a first substrate;
   a first electrode formed on the first substrate, wherein the first electrode comprises a plurality of subpixels, and each the subpixel comprises a plurality of subunits, and each the subunit comprises a plurality of first slits and a plurality of second slits, wherein the first slits are connected to the second slits and the first slits of the subunits which are adjacent to each other are connected to each other;
   a second substrate opposite to the first substrate;
   a second electrode formed on the second substrate; and
   a liquid crystal layer disposed between the first electrode and the second electrode.

2. The liquid crystal display as claimed in claim 1, wherein the first substrate comprises a color filter.

3. The liquid crystal display as claimed in claim 1 wherein the first slits are arranged in a cross shape.

4. The liquid crystal display as claimed in claim 1, wherein the second slits are arranged at an oblique angle to the first slits.

5. The liquid crystal display as claimed in claim 4, wherein the oblique angle is 0°, 45°, 90° or 135°.

6. The liquid crystal display as claimed in claim 1, wherein the second substrate comprises a thin film transistor.

7. The liquid crystal display as claimed in claim 1, wherein the second electrode comprises a plurality of subpixels, and each the subpixel comprises a plurality of subunits and a plurality of third slits, wherein the subunits are separated by the third slits.

8. The liquid crystal display as claimed in claim 7, wherein the third slits between the two subunits which are adjacent to each other of the second electrode are connected to each other.

9. The liquid crystal display as claimed in claim 7, wherein the third slits are arranged in a cross shape.

10. The liquid crystal display as claimed in claim 7, further comprising a plurality of fourth slits connected to the third slits.

11. The liquid crystal display as claimed in claim 10, wherein the fourth slits are arranged at an oblique angle to the third slits.

12. The liquid crystal display as claimed in claim 11, wherein the oblique angle is 0°, 45°, 90° or 135°.

13. The liquid crystal display as claimed in claim 10, wherein the second electrode in a junction of the third slit and the fourth slit is an electrical connection area.

14. The liquid crystal display as claimed in claim 7, wherein the second electrode in an extended axis of the third slit is an electrical connection area.

15. The liquid crystal display as claimed in claim 14, wherein the electrical connection area has a width of 2-6 μm.

16. The liquid crystal display as claimed in claim 1, wherein the first electrode in an extended axis of the first slit is an electrical connection area.

17. The liquid crystal display as claimed in claim 16, wherein the electrical connection area has a width of 2-6 μm.

18. The liquid crystal display as claimed in claim 1, wherein the first electrode in a junction of the first slit and the second slit is an electrical connection area.

* * * * *